United States Patent
Chakkalackal et al.

(10) Patent No.: US 12,159,019 B2
(45) Date of Patent: Dec. 3, 2024

(54) MULTI-OPTION NAVIGATION FOR INDUSTRIAL ASSET MANAGEMENT

(71) Applicant: Baker Hughes Holdings LLC, Houston, TX (US)

(72) Inventors: Jojy Tom Chakkalackal, Bangalore (IN); Jacqueline Tappan, Houston, TX (US); Mandar Sadashiv Joshi, Pune (IN)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/515,353

(22) Filed: Oct. 29, 2021

(65) Prior Publication Data

US 2023/0130466 A1    Apr. 27, 2023

Related U.S. Application Data

(60) Provisional application No. 63/270,417, filed on Oct. 21, 2021.

(51) Int. Cl.
*G06F 3/00* (2006.01)
*G06F 3/0482* (2013.01)
*G06F 3/0484* (2022.01)

(52) U.S. Cl.
CPC .......... *G06F 3/0482* (2013.01); *G06F 3/0484* (2013.01)

(58) Field of Classification Search
CPC .............................. G06F 3/0482; G06F 3/0484
See application file for complete search history.

(56) References Cited

U.S. PATENT DOCUMENTS

| | | | |
|---|---|---|---|
| 10,409,809 B2 | 9/2019 | Schindlauer et al. | |
| 10,459,432 B2 | 10/2019 | Mohanty | |
| 10,528,234 B2 | 1/2020 | Brown et al. | |
| 10,885,451 B2 | 1/2021 | Guruswamappa et al. | |
| 11,650,897 B2 | 5/2023 | Khanolkar et al. | |
| 2004/0186927 A1 | 9/2004 | Eryurek et al. | |

(Continued)

OTHER PUBLICATIONS

Komljenovic et al. (Oct. 2016) "Risks of Extreme and Rare Events in Asset Management", Safety Science, 88:129-145.

(Continued)

*Primary Examiner* — Brett A Feeney
*Assistant Examiner* — Andrew Chung
(74) *Attorney, Agent, or Firm* — Mintz, Levin, Cohn, Ferris, Glovsky and Popeo, P.C.

(57) ABSTRACT

Systems and methods for improved visualization of events logged by an asset management system are provided herein. In one aspect, a priority index can be determined for respective assets based upon the events they experience. In another aspect, one or more graphical user interfaces (GUIs) can be generated by a computing device for navigation between different assets. The GUIs can allow a user to choose from multiple navigation options for display of assets and respective asset information. As an example, asset views can include views based upon one or more of an asset hierarchy within a fleet, a priority index, or a shortlist of assets based upon personal interests of a user or shared interests of a group, also referred to as a watchlist herein. The GUIs can further allow a user to view summaries of events and/or details regarding events for selected assets, such as alarms and case assignments.

10 Claims, 14 Drawing Sheets

(56) References Cited

U.S. PATENT DOCUMENTS

| | | | |
|---|---|---|---|
| 2006/0161463 A1* | 7/2006 | Poonnen | G06Q 40/08 |
| | | | 707/999.01 |
| 2007/0240071 A1 | 10/2007 | Sherrill et al. | |
| 2007/0288295 A1* | 12/2007 | O'Brien | G06Q 10/0639 |
| | | | 705/7.11 |
| 2008/0271057 A1* | 10/2008 | Bates | G05B 19/418 |
| | | | 719/328 |
| 2009/0077055 A1* | 3/2009 | Dillon | G05B 23/0272 |
| | | | 707/999.005 |
| 2009/0216698 A1 | 8/2009 | Bouchard et al. | |
| 2011/0246337 A1* | 10/2011 | Wisman | G06Q 10/087 |
| | | | 705/28 |
| 2012/0259436 A1 | 10/2012 | Resurreccion et al. | |
| 2012/0304300 A1* | 11/2012 | LaBumbard | G06F 21/577 |
| | | | 726/25 |
| 2014/0108985 A1 | 4/2014 | Scott et al. | |
| 2015/0100892 A1* | 4/2015 | Cronin | G06Q 10/0633 |
| | | | 715/747 |
| 2015/0143211 A1 | 5/2015 | Kaufthal et al. | |
| 2016/0266739 A1* | 9/2016 | Folken | G06F 3/04817 |
| 2017/0106883 A1* | 4/2017 | Shubs, Jr. | B61L 15/009 |
| 2017/0336930 A1* | 11/2017 | Tappan | G08B 21/18 |
| 2019/0102074 A1 | 4/2019 | Uy et al. | |
| 2019/0287052 A1* | 9/2019 | Sundar | G06Q 10/06311 |
| 2020/0135006 A1 | 4/2020 | Costello et al. | |
| 2020/0241990 A1* | 7/2020 | Gustafson | G06F 11/3089 |
| 2023/0004470 A1 | 1/2023 | Khanolkar et al. | |

OTHER PUBLICATIONS

Naphade et al. (Dec. 10, 2002) "Discovering Recurrent Events in Video Using Unsupervised Methods", Proceedings. International Conference on Image Processing, IEEE, 13-16.

Xu et al. (Jul. 2016) "Detecting Rare Events Using Kullback-Leibler Divergence: A Weakly Supervised Approach", Expert Systems with Applications, 54:13-28.

* cited by examiner

FIG. 8

Navigation Option, 202

| Hierarchy | Priority | Watchlist |

Filter and Sort ✕

Sort By: Sort, *805* ▶

Filter By:
Location | Location, *806* |

Event Severity, 810
Asset, 810a  ④ ③ ② ①
Instrumentation, 810b  ④ ③ ② ①

Event Status, 812
☐ Unacknowledged
☐ Acknowledged

Case Priority, 814
☐ High ☐ Medium ☐ Low

Case Status, 816
☐ Open ☐ Review ☐ Closed

Clear  Cancel  Filter

Filter and Sort Options, 804

---

Asset N
*Hierarchical Position*                    PI ↑

Asset 2
*Hierarchical Position*                    PI ↓

· · ·

Asset 1
*Hierarchical Position*                    PI ↑

Sorted/Filtered Priority Asset List, 820

GUI, 800

FIG. 11C

*Detail View, 1150*

*1152*

Case ID 1
Asset ID
Assigned to

Case ID 2
Asset ID
Assigned to

Case ID 3
Asset ID
Assigned to

*1154*

| | | |
|---|---|---|
| Action 1 | Date | Approved By |
| Action 2 | Date | Approved By |
| Action 3 | Date | Approved By |

Filter and Sort    ✕

Sort By:  [A-Z ▼]

Filter By:
○ Filter Option 1
○ Filter Option 2
○ Filter Option 3
○ Filter Option 4

Clear    Cancel    Filter

*Filter and Sort Options, 1122*

MULTI-OPTION NAVIGATION FOR INDUSTRIAL ASSET MANAGEMENT

CROSS-REFERENCE TO RELATED APPLICATIONS

This application claims the benefit of U.S. Provisional Patent Application No. 63/270,417, filed on Oct. 21, 2021, entitled "Multi-Option Navigation For Industrial Asset Management," the entirety of which is incorporated by reference.

BACKGROUND

Many industries, such as hydrocarbon extraction, refining, and power generation, can rely heavily upon operation of assets (e.g., machinery), and in some instances, continuous operation of such assets. In these environments, unplanned asset shutdown and/or failure can incur severe consequences, ranging from expenses due to loss of production and/or expenses, to potential injury to workers, amongst others. Given these risks, it can be common to monitor selected parameters of various assets during operation. Measurements of the operating parameters can provide an indication of the condition of a respective asset components, as well as the asset as a whole. As a result, deviations in asset operation from normal operation can be identified and addressed to avoid asset shutdown and/or failure. Thus, asset management can provide a variety of long-term benefits, such as lower production costs, reduced equipment down time, improved reliability, and enhanced safety.

SUMMARY

Condition monitoring systems can be configured to report a variety of events characterizing deviation in asset performance from pre-determined normal operation conditions. As an example, set points can be used to define a normal operation range and measurement of operating parameters outside of this range can be flagged as an event.

Historically, asset condition monitoring has been performed at the site level, where events are monitored on a site-by-site basis. Recently, though, many users have moved from site-based asset condition monitoring to a combination of site-based and centralized asset condition monitoring. However, visualizations developed for existing centralized asset condition monitoring can present event data for a large number assets (e.g., on the order of thousands). Given this large number of events it can be challenging for a user to identify which events to prioritize over others.

As an example, existing asset management applications can provide a user with a hierarchical view of assets, organized by site. While visualization in this manner can be a useful organizational and navigational construct, it does not lend itself to focusing on the highest priority asset events.

In another example, existing asset management applications can present information conveying asset health through overall alarm status. However, with thousands of assets under management, this manner of visualization can result in a visual "sea of red," again making it difficult to prioritize and focus attention.

In a further example, when collaborating with multiple users to manage an asset fleet, it can be difficult for a user to determine which events are being investigated using existing asset management applications.

Thus, existing asset management systems can lack flexible prioritization workflow, along with the ability to see if colleagues are already investigating an asset issue, resulting in delays in monitoring and potential mismanagement of assets.

Accordingly, systems and methods for improved visualization of events logged by a condition monitoring system are provided herein. In one aspect, a priority index can be determined for respective assets based upon the events they experience. In another aspect, one or more graphical user interfaces (GUIs) can be generated by a computing device for navigation between different assets. The GUIs can allow a user to choose from multiple navigation options for display of assets and respective asset information. As an example, asset views can include views based upon one or more of an asset hierarchy within a fleet, a priority index, or a shortlist of assets based upon personal interests of a user or shared interests of a group, also referred to as a watchlist herein. The GUIs can further allow a user to view summaries of events and/or details regarding events for selected assets, such as alarms and case assignments.

Embodiments of this approach provide a variety of benefits. In one example, a user can select a viewing option that is most suited to their preferred workflow and/or current needs. This flexibility can help users make decisions regarding assets more quickly and deploy resources for asset maintenance more effectively.

In an embodiment, an asset management system is provided. The system can include a historian and an analyzer. The historian can be configured to maintain a plurality of asset data characterizing respective assets of a plurality of assets distributed among different sites of a fleet. The asset data for an asset can include an asset identifier, a location of the asset within an asset hierarchy of the fleet, event data characterizing one or more events experienced by the asset, and a priority index that characterizes the one or more events. The analyzer can include one or more processors configured to receive the plurality of asset data. The analyzer can also be configured to generate a graphical user interface (GUI) including a plurality of asset navigation options, receive, via the GUI, a first selection of an asset navigation option from the plurality of asset navigation options, update the GUI in response to receipt of the first selection to include a first window listing a plurality of assets displayed according to the selected navigation option, receive a second selection of at least one asset from the plurality of assets, update the GUI to include a second window including at least one of a representation of at least one event associated with the at least one asset and the priority index corresponding to the at least one asset, and output the GUI.

In another embodiment, the plurality of asset navigation options can include a hierarchy option. When the first selection is the hierarchy option, the plurality of assets listed within the first window can include a hierarchical asset list including a plurality of levels with respective assets of the plurality of assets organized under respective levels according to their position within the asset hierarchy of the fleet.

In another embodiment, absent receipt of the second selection within the first window the representation of the second window can be a representation of at least one event of the plurality of assets or the priority index corresponding to the at least one asset.

In another embodiment, when a site level of the hierarchical asset list is the second selection, the at least one asset can be a portion of the plurality of assets organized under the selected site level, and the representation of the second window can be a representation of at least one event of the portion of the plurality of assets that are organized under the selected site level or the priority index corresponding to the at least one asset.

In another embodiment, when an asset level of the hierarchical asset list is the second selection, the at least one asset can be the selected asset, and the representation of the second window can be a representation of at least one event of the selected asset or the priority index corresponding to the at least one asset.

In another embodiment, the plurality of asset navigation options can include a priority option. When the first selection is the priority option, the plurality of assets listed within the first window can be a prioritized asset list including the plurality of assets ranked according to their respective priority index.

In another embodiment, absent receipt of the second selection, the at least one asset can be the plurality of assets, and the representation of the second window can be a representation of at least one event of the plurality of assets or the priority index corresponding to the at least one asset.

In another embodiment, when an asset of the prioritized asset list is the second selection, the at least one asset can be the selected asset, and the representation of the second window can be a representation of at least one event of the plurality of assets or the priority index corresponding to the at least one asset.

In another embodiment, the analyzer can be further configured to receive, via the GUI, selection of one or more assets from the plurality of assets, and store the selected one or more assets in a watchlist.

In another embodiment, the plurality of asset navigation options can include a watchlist option. When the first selection is the watchlist option, the GUI can be configured to receive a watchlist selection, and the plurality of assets listed within the first window can be an asset watchlist including the one or more assets of the selected watchlist.

In another embodiment, absent receipt of the second selection, the at least one asset can be the one or more assets of the selected watchlist, and the representation of the second window can be a representation of at least one event of the one or more assets of the selected watchlist or the priority index corresponding to the one or more assets of the selected watchlist.

In another embodiment, when an asset of the selected watchlist is the second selection, the at least one asset can be the selected asset, and the representation of the second window can be a representation of the selected asset or the priority index corresponding to the selected asset.

In another embodiment, the event can be at least one of an alarm, a condition monitoring system health event, an instrument health event, and an analytical health event.

In an embodiment, a method of asset management is provided. The method can include maintaining, by a memory device, a plurality of asset data characterizing respective assets of a plurality of assets distributed among different sites of a fleet. The asset data for an asset can include an asset identifier, a location of the asset within an asset hierarchy of the fleet, event data characterizing one or more events experienced by the asset, and a priority index that characterizes the one or more events. The method can also include receiving, by one or more processors, the plurality of asset data. The method can further include generating, by the one or more processors, a graphical user interface (GUI) including a plurality of asset navigation options. The method can additionally include receiving, by the one or more processors via the GUI, a selection of an asset navigation option from the plurality of asset navigation options. The method can also include updating, by the one or more processors, the GUI in response to receipt of the first selection to include a first window listing a plurality of assets displayed according to the selected navigation option. The method can additionally include receiving, by the one or more processors, a second selection of at least one asset from the plurality of assets. The method can also include updating, by the one or more processors, the GUI to include a second window including at least one of a representation of at least one event associated with the at least one asset or the priority index corresponding to the at least one asset. The method can further include outputting, by the one or more processors, the GUI.

In another embodiment, the plurality of asset navigation options can include a hierarchy option. When the selection is the hierarchy option, the plurality of assets listed within the first window can include a hierarchical asset list including a plurality of levels with respective assets of the plurality of assets organized under respective levels according to their position within the asset hierarchy of the fleet.

In another embodiment, absent receipt of the second selection within the first window, the at least one asset can be the plurality of assets, and the representation of the second window can be a representation of at least one event of the plurality of assets or the priority index corresponding to the at least one asset.

In another embodiment, when a site level of the hierarchical asset list the second selection, the at least one asset can be a portion of the plurality of assets organized under the selected site level, and the representation of the second window can be a representation of at least one event of the portion of the plurality of assets that are organized under the selected site level or the priority index corresponding to the at least one asset.

In another embodiment, when an asset level of the hierarchical asset list is the second selection, the at least one asset can be the selected asset, and the representation of the second window can be a representation of at least one event of the selected asset or the priority index corresponding to the at least one asset.

In another embodiment, the plurality of asset navigation options can include a priority option. When the selection is the priority option, the plurality of assets listed within the first window can be a prioritized asset list including the plurality of assets ranked according to their respective priority index.

In another embodiment, absent receipt of the second selection, the at least one asset is the plurality of assets, and the representation of the second window can be a representation of at least one event of the plurality of assets or the priority index corresponding to the at least one asset.

In another embodiment, when an asset of the prioritized asset list is the second selection, the at least one asset can be the selected asset, and the representation of the second window can be a representation of at least one event of the plurality of assets or the priority index corresponding to the at least one asset.

In another embodiment, the method can further include, by the one or more processors, receiving, via the GUI, selection of one or more assets from the plurality of assets, and storing the selected one or more assets in a watchlist.

In another embodiment, the plurality of asset navigation options can include a watchlist option. When the first selection is the watchlist option, the GUI can be configured to receive a watchlist selection, and the plurality of assets listed within the first window can be a watchlist asset list including the one or more assets of the selected watchlist.

In another embodiment, absent receipt of the second selection, the at least one asset can be the one or more assets of the selected watchlist, and the representation of the second window is a representation of at least one event of the plurality of assets or the priority index corresponding to the at least one asset.

In another embodiment, when an asset of the selected watchlist is the second selection, the at least one asset can be the selected asset, and the representation of the second window can be a representation of at least one event of the plurality of assets or the priority index corresponding to the at least one asset.

In another embodiment, the event can be at least one of an alarm, a condition monitoring system health event, an instrument health event, and an analytical health event.

BRIEF DESCRIPTION OF THE DRAWINGS

These and other features will be more readily understood from the following detailed description taken in conjunction with the accompanying drawings, in which:

FIG. 8 is a schematic diagram illustrating the GUI of FIG. 2 after selection of the priority navigation option from the navigation options and further illustrating options for event filtering and sorting;

FIGS. 11A-11C are schematic diagrams illustrating additional embodiments of detailed event information presented in the second window.

It is noted that the drawings are not necessarily to scale. The drawings are intended to depict only typical aspects of the subject matter disclosed herein, and therefore should not be considered as limiting the scope of the disclosure.

DETAILED DESCRIPTION

Embodiments of systems and corresponding methods for prioritizing visualization of events for condition monitoring are discussed herein. However, embodiments of the disclosure can be employed to for visualization of other data without limit.

Figure 1:
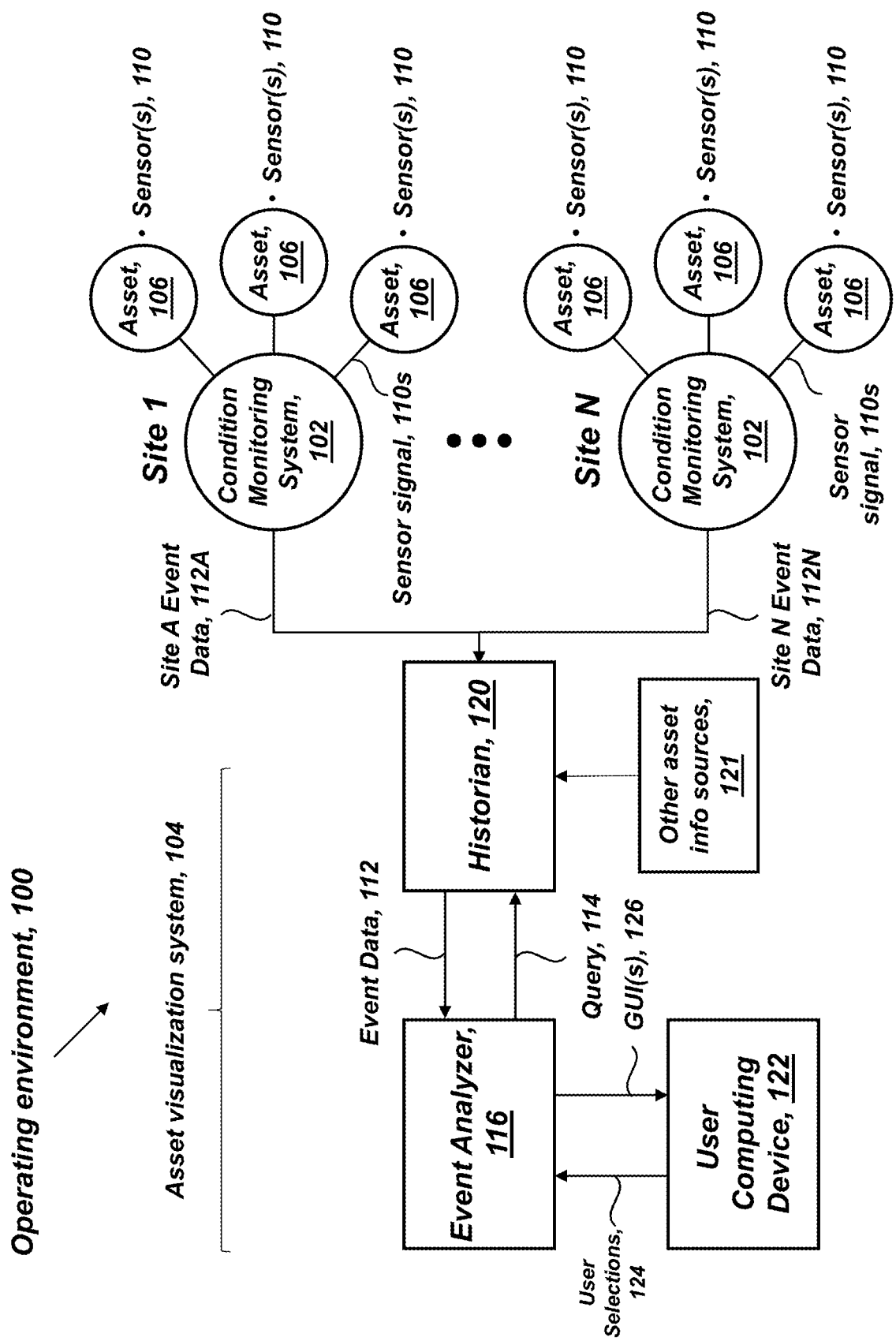
FIG. 1 is a schematic diagram illustrating one exemplary embodiment of an operating environment including an improved asset visualization system for condition monitoring of an asset including an event analyzer.

FIG. 1 is a schematic diagram illustrating one exemplary embodiment of an operating environment 100 including an asset visualization system 104. Embodiments of the asset visualization system 104 can be in communication with one or more sources of information regarding assets under management. In one aspect, such sources can include one or more condition monitoring systems 102 configured to monitor one or more managed assets 106. In another aspect, such sources can include one or more other information sources 121 providing information regarding asset analytics, asset strategy (e.g., asset maintenance, etc.) As an example, the information sources 121 can be a computerized maintenance management system (CMMS) that maintains information regarding maintenance of respective assets 106. As discussed in greater detail below, the asset visualization system 104 can employ information received from the information sources (e.g., 102 and/or 121) to generate a priority index for one or more of the assets 106. This priority index can be employed to organize display of respective assets in a graphical user interfaces (GUIs).

As shown, a plurality condition monitoring systems 102 can be in communication with the asset visualization system 104, each present at a respective site (e.g., Site 1 . . . Site N). Respective condition monitoring systems 102 can be in further communication with one or more sensors 110.

Embodiments of the assets 106 can include any machine or machine component for which monitoring is desired. In certain embodiments, the assets 106 can be machines including rotating components, reciprocating components, and/or fixed asset components. Rotating components can include, but are not limited to, gears, bearings, and shafts, amongst others. Specific examples of machines containing rotating components can include, but are not limited to, turbomachines, turbines (e.g., hydro, wind), generators, and reciprocating compressors, amongst others.

As discussed in greater detail below, the assets 106 can be arranged in an asset hierarchy including a plurality of levels. In general, one or more asset levels can be defined by an asset owner/operating entity. Exemplary asset levels are discussed briefly below. It can be appreciated that this discussion of asset levels is provided for example only and that these or other asset levels can be employed, alone or in combination without limit.

The lowest level of the asset hierarchy can be asset components. The next level up from asset components can be an asset level, where each asset 106 listed at the asset level encompasses all of the components of that asset 106. As an example, for a recycle compressor asset, asset components can include a motor, a gearbox, and a compressor. The next level up from assets 106 can be an asset group level, where each asset group listed at the asset group level encompasses all of the assets associated with that asset group. Assets 106 can be grouped according to any predetermined criteria, such as functionality or process. In one example, a hydrocracker asset group can include respective assets 106 such as a recycle compressor, a make-up compressor, and a charge pump. The next level up from asset groups can be a site level, where each site listed at the site level can encompass all assets associated with that site. As an example, a refinery site can include asset groups such as alkylation, atmospheric distillation, coker, fluidic catalytic cracking, hydrocracker, reformer, and vacuum distillation. The final level up from sites can be a fleet level, which includes all assets 106 at all sites. It can be appreciated that the examples above are provided for illustration and that the asset hierarchy can include any assets and any number of levels, as necessary.

The one or more sensors 110 can be configured to sense one or more operating parameters of respective assets 106. The sensors 110 can be further configured to generate at least one sensor signal 110s representing the measured operating parameter, and to output sensor signals 110s to a respective condition monitoring system 102 (e.g., via field wiring). As an example, the sensors 110 can include a probe, a transducer, and a signal conditioning circuit (not shown). The probe can interact with the asset 106 for measurement of the operating parameter. The transducer can convert measurements of the operating parameter into an electrical signal (e.g., a voltage), and the signal conditioning circuit can condition and/or amplify the electrical signal to generate the sensor signals 110s (e.g., a voltage ranging between a minimum and maximum). Thus, in one aspect, the sensor signals 110s can contain the direct or raw measurement made by the sensor transducer. The sensor signals 110s can be analog signals or digital signals.

In another aspect, the sensor signals 110s can include information in addition to the direct measurements of an operating parameter. As an example, the sensor signals 110s can include metadata regarding one or more components of the corresponding sensors 110, such as the transducer. Examples of metadata can include, but is not limited to, one or more of a serial number, revision number, operating temperature, and state of health.

The number and type of sensors 110 can be dictated by the operating parameter(s) that are intended to be measured. In one aspect, the sensors 110 can take the form of one or more proximity probes for measurement of vibration, position, speed, direction of motion, and eccentricity. In another aspect, the sensors 110 can take the form of one or more accelerometers for measurement of seismic vibration and acceleration. In a further aspect, the sensors 110 can take the form of one or more temperature probes or pressure probes for measurement of temperature and pressure, respectively. It can be understood that the types of sensors 110 and corresponding measured operating parameters discussed above are not exhaustive and embodiments of the sensors can include any sensor or combination of sensors suitable for measurement of operating parameters of interest.

In use, the condition monitoring system 102 can be configured to analyze the received sensor signals 110s and to identify events regarding the corresponding monitored assets 106. As an example, the condition monitoring system 102 can be configured to determine a value characterizing an operating parameter measurement. The condition monitoring system 102 can also be configured to compare determined values to one or more corresponding predetermined set points or other conditions (e.g., alarm conditions) to determine an alarm status (e.g., OK, Not OK, over, under, etc.) As an example, OK/Not OK can represent a pass/fail condition, while over/under can represent measurement of one or more operating parameters over a set point or under a set point respectively.

For instance, when the asset 106 is a rotating shaft and the measured operating parameter is radial vibration of the shaft, the sensor signal 110s can include measurements of displacement of the shaft as a function of time. From the sensor signals 110s, the condition monitoring system 102 can determine the value of vibration amplitude from the peak-to-peak displacement. Under circumstances where the alarm status indicates operation of the asset 106 outside of a normal operating range, the condition monitoring system 102 can log the alarm as an event.

In further embodiments, the condition monitoring system 102 can be configured to analyze operational parameters received from multiple sensors 110 using defined logic and/or models to extract advanced insights of asset fault conditions. These operational parameters can be measured from a single component/asset or multiple components/assets.

The condition monitoring system 102 can be further configured to perform monitoring of in a similar fashion upon itself. The additional monitoring can be grouped into a variety of categories and can include, but is not limited to, system health, instrument health, and analytical health.

System health can include the health of any aspect of the hardware and/or software supporting the functionality of the condition monitoring system 102. The condition monitoring system 102 can receive data from its software/hardware and employ this data in conjunction with set points or other programmed logic to determine whether a system health event has occurred and should be logged. Examples of system health can include, but are not limited to, configuration settings, loss of communication, drivers, firmware/hardware updates, data wrapping/loss, etc.

Instrument health can include any aspect of the operation of the sensors 110 to collect sensor data. The condition monitoring system 102 can receive metadata from the sensors 110 regarding their operation and employ this data in conjunction with set points or other programmed logic to determine whether an instrument health event has occurred and should be logged. Examples of instrument health can include, but are not limited to, instrument faults, instrument OK status, and instrument communication status.

Analytical health can include the logic employed for identifying events (e.g., alarms and additional monitoring). As an example, rules/criteria defining when the condition monitoring system 102 logs an event (e.g., an event source) can be prepared by one or more authorized parties, such as a manufacturer, owner, user of the condition monitoring system. The condition monitoring system 102 can receive metadata regarding logic employed for event identification and employ this data in conjunction with predetermined set points or other criteria defining normal and abnormal operation of event identification logic determine whether an event has occurred and should be logged. Examples of analytical health can include, but are not limited to presence/absence of event identification logic.

In general, regardless of the event type, when an event is logged, selected event data regarding that event can be recorded. Examples of event data can include, but are not limited to, a location of the affected asset within the asset hierarchy of the fleet, and at least one event parameter corresponding to the event (e.g., an operating parameter measurement in the case of an alarm event). The event parameters can optionally include one or more of the following:

Event identifier: A name or other designation (e.g., an alphanumeric string) that identifies an event.

Asset state: An operating state of the asset to which an event pertains. Examples can include, but are not limited to, startup, running (normal operation), shutdown, etc.

Measurement type and measurement point: The measurement type is the category of measurement used to identify the event (e.g., vibration, temperature, pressure, etc.) The measurement point is a channel used to acquire the values for the measurement type (e.g., the sensor(s) 110).

Event Trigger: One or more set points used to identify the event.

Event type: A classification of the event (e.g., NOT OK, over, under, etc.),

Event source: One or more logic packages employed to identify an event. Such logic packages can be received from a variety of sources, including but not limited to, manufacturers, owners, users of the condition monitoring system, and/or other integrated applications.

Event time: A time or time duration at which the event occurred (e.g., entered time, exited time, etc.)

Event level: A relative measure of priority of the event. The event level can be determined by the condition monitoring system 102 after an event has been identified.

Event parameter measurement(s): The operating parameter measurement(s) used to identify the event. When the event is transitory, the operating parameter measurement(s) can be a single operational parameter measurement(s) Alternatively, when the event persists, the operating parameter measurement(s) can be a plurality of operating parameter measurements acquired during at least a portion of the event (e.g., operational parameter measurements acquired between the event entered time and the event exited time)

One or more of the condition monitoring systems 102 can be configured to output the event data logged for assets 106 of its respective site. In certain embodiments, as shown in FIG. 1, the asset visualization system 104 can be in communication with the plurality of condition monitoring systems 102 and event data can be received therefrom (e.g., site A event data 112A . . . site N event data 112N, collectively event data 112). In alternative embodiments, not shown, the condition monitoring system can output the event data to another computing device. Subsequently, the condition monitoring system can retrieve the event data.

As shown, the asset visualization system 104 includes an event analyzer 116 in communication with a historian 120, and a user computing device 122. The historian 120 can be one or more computing devices configured to store event data 112 received from the plurality of condition monitoring systems 102. The event analyzer 116 can be one or more computing devices configured to submit queries 114 to the historian 120 for retrieval of stored event data 112. Subsequently, the event analyzer 116 can generate graphical user interfaces (GUIs) 126 based upon the received event data 112 and transmit the GUIs 126 to the user computing device 122 for display. The user computing device 122 can be configured to display GUIs 126 generated by the event analyzer 116, as well as receive user selections 124 within the GUI 126. In certain embodiments, GUIs 126 can be updated based upon user selections 124.

As discussed in greater detail below, the GUIs 126 can be configured to simplify the management of many assets 106 (e.g., thousands of assets 106). In certain embodiments, the assets 106 can be spread across multiple global sites. Specifically, the event analyzer 116 can generate GUIs including a plurality of different navigation options for organizing display of the assets 106. As discussed in greater detail below, the navigation options can include hierarchy-based views and priority-based views, and/or combinations thereof.

In general, a priority index PI can be generated by the event analyzer 116. The priority index PI can be configured to characterize a relative level of attention required for a given asset. In one embodiment, the priority index can be based upon events experienced by respective assets (e.g., event data 112). In another embodiment, the priority index PI can be based upon information received from the one or more other asset information sources 121, such as asset analytics, asset strategy (e.g., maintenance), etc. In further embodiments, the priority index PI can be based upon combinations of event data and other asset information.

Priority indices PI can be generated at any hierarchical level (e.g., asset level, asset group level, site level, fleet level, etc.) by propagating the highest priority index PI for assets belonging to the hierarchical level. At the asset level, the priority index PI of a given asset can be the priority index generated for that asset, or the highest priority index PI for components of that asset (under circumstances where priority index PI for respective components is determined). At the asset group level, the priority index PI of a given asset group can be the highest priority index PI for assets belonging to that asset group. At the site level, the priority index PI of a given site can be the highest priority index PI for assets belonging to that site. At the fleet level, the priority index PI of the fleet can be the highest priority index PI for assets belonging to the fleet.

Embodiments of the GUIs 126 can provide the user with the option to select from different asset navigation views, including hierarchy-based views, priority-based views, and user-defined watchlist views, as discussed in detail below. In brief, the hierarchy navigation view allows users to view assets 106 organized by hierarchical levels within a fleet. In the priority-based navigation view, users can view assets 106 organized according to their respective priority index PI. In a watchlist-based navigation view, assets 106 designated as belonging to one or more watchlists (e.g., a personal watchlist including a plurality of assets 106 that are designated by a user based upon their personal interests, a group watchlist including a plurality of assets 106 that are designated by one or more users based upon shared interests within a team of users). Once a watchlist is defined, users can view the assets 106 of a selected watchlist. In certain embodiments, the assets 106 of the selected watchlist can be organized according to their respective priority index PI. However, embodiments of the GUI 126 can be further configured to organize the assets 106 of the selected watchlist by one or more other criteria, as desired.

After an asset navigation view is selected, the user can select an asset 106 from from the displayed assets. Once the asset is selected, more detailed information can be displayed. The event detail information is designed to allow the user to view specific information regarding respective events experienced by the selected asset. The event detail information can adopt a variety of forms, alone or in combination. In one aspect, the event detail information can be a graphical representation of the selected asset with priority index PI overlaid thereon. In another aspect, the event detail information can list respective events and relevant data. For example, in the case of alarms, the event detail information can list respective alarms experienced by an asset, set points for alarms, operational parameter values triggering the alarms, data plots (e.g., trends over time), etc. In another aspect, the event detail information can be information regarding case assignments for respective events of the selected asset. Case assignments can indicate whether or not an event has been assigned to a user for review, the status of such review, maintenance scheduled and/or performed to address a respective event, etc.

Beneficially, by providing users the ability to select from various navigation options, alone or in combination with priority index PI information, a user can select the view which is most suitable for them (e.g., based upon their workflow, persona, objectives, and/or current task needs). The addition of priority index PI information further facilitates identification of those asset in greatest need of attention. These viewing options can also include contextual search and filtering tools to allow users to quickly identify assets of interest.

The priority index PI can be determined by the event analyzer 116 in a variety of ways. The priority index PI can be generated based upon one or more defined inputs. The inputs can be defined by an authorized entity. Examples of such authorized entities can include, but are not limited to, a manufacturer of the asset visualization system 104, a user of the condition monitoring system, a user of the asset visualization system 104, regulatory agencies, alone or in any combinations. It can be appreciated that, in further embodiments, multiple priority indices PI, defined in different ways, can be generated by the event analyzer 116 and presented in the GUIs 126.

A variety of different inputs can be employed, alone or in combination, to define the priority index PI. Examples of inputs can include, but are not limited to, one or more parameters characterizing a relative importance of the asset, one or more parameters characterizing respective events, asset analytics, asset strategy (e.g., maintenance), alone or in any combination. In further embodiments, one or more of the inputs can also be assigned a weighting.

It can be appreciated that the inputs discussed above for generating a priority index PI are presented for example only. Other inputs can be employed within the context of the disclosed embodiments without limit.

The discussion now turns to exemplary embodiments of the GUIs 126 generated by the event analyzer 116 according to the different view selection options with reference to FIGS. 2-11C.

Figure 2:
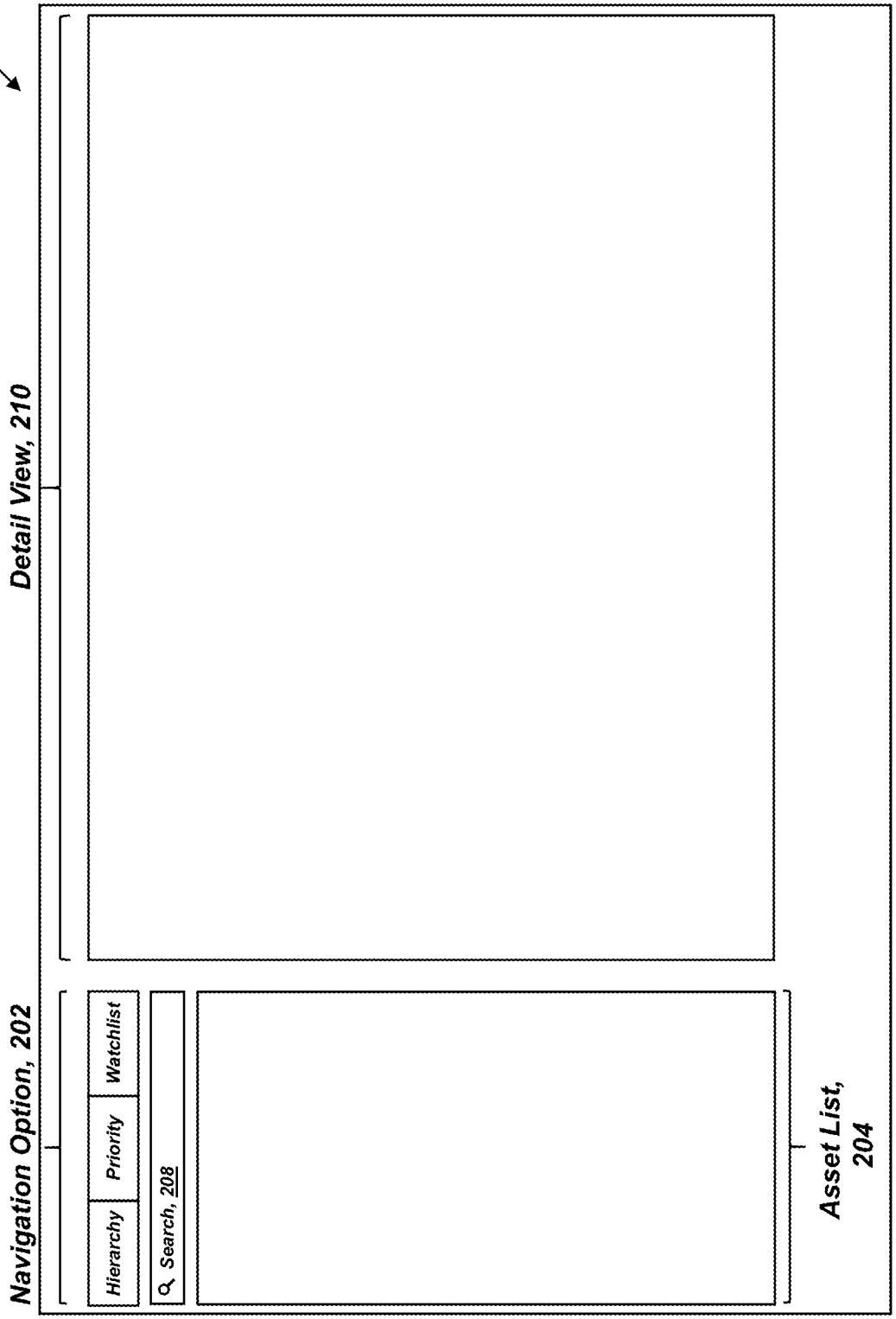
FIG. 2 is a schematic diagram illustrating one exemplary embodiment of a graphical user interface (GUI) generated by the event analyzer of FIG. 1 including a first window presenting asset navigation options and a list of assets displayed according to a selected navigation option and a second window including details regarding at least one asset selected from the list of assets.

FIG. 2 is a schematic diagram illustrating one exemplary embodiment of the GUI 126. As discussed in detail below, the GUI 126 can include a first window including a navigation option 202 and an asset list 204, and a second window including a detail view 210. The navigation option 202, asset list 204, and detail view 210 can be presented alone or in any combination.

The navigation option 202 can include navigation options for hierarchy navigation, priority navigation, and watchlist navigation. After selection of a navigation option, a list of assets 106 corresponding to the selected navigation option can be further presented in the asset list 204. Selection of the hierarchy navigation option results in presentation of the assets 106 in a hierarchical list in the asset list 204. Selection of the priority navigation option results in presentation of the assets 106 in a list ordered by priority index PI in the asset list 204. Selection of the watchlist navigation option results in presentation of only assets 106 of one or more selected watchlists (e.g., a personal or shared group watchlist) in the asset list 204, ordered by priority index PI.

The GUI 126 is configured to allow a user to select an asset 106 from the asset list 204. Subsequently, the GUI 126 can be updated to present the detail view 210. The detail view 210 can include detailed information regarding at least one event corresponding to the selected asset 106, discussed in detail below. The detailed information can include, but is not limited to, lists, plots, and other graphical representations. Further examples can include graphical representations of the fleet, asset, components, and corresponding priority indices PI. Further details regarding the detail view 210 are discussed in detail below.

Figure 3:
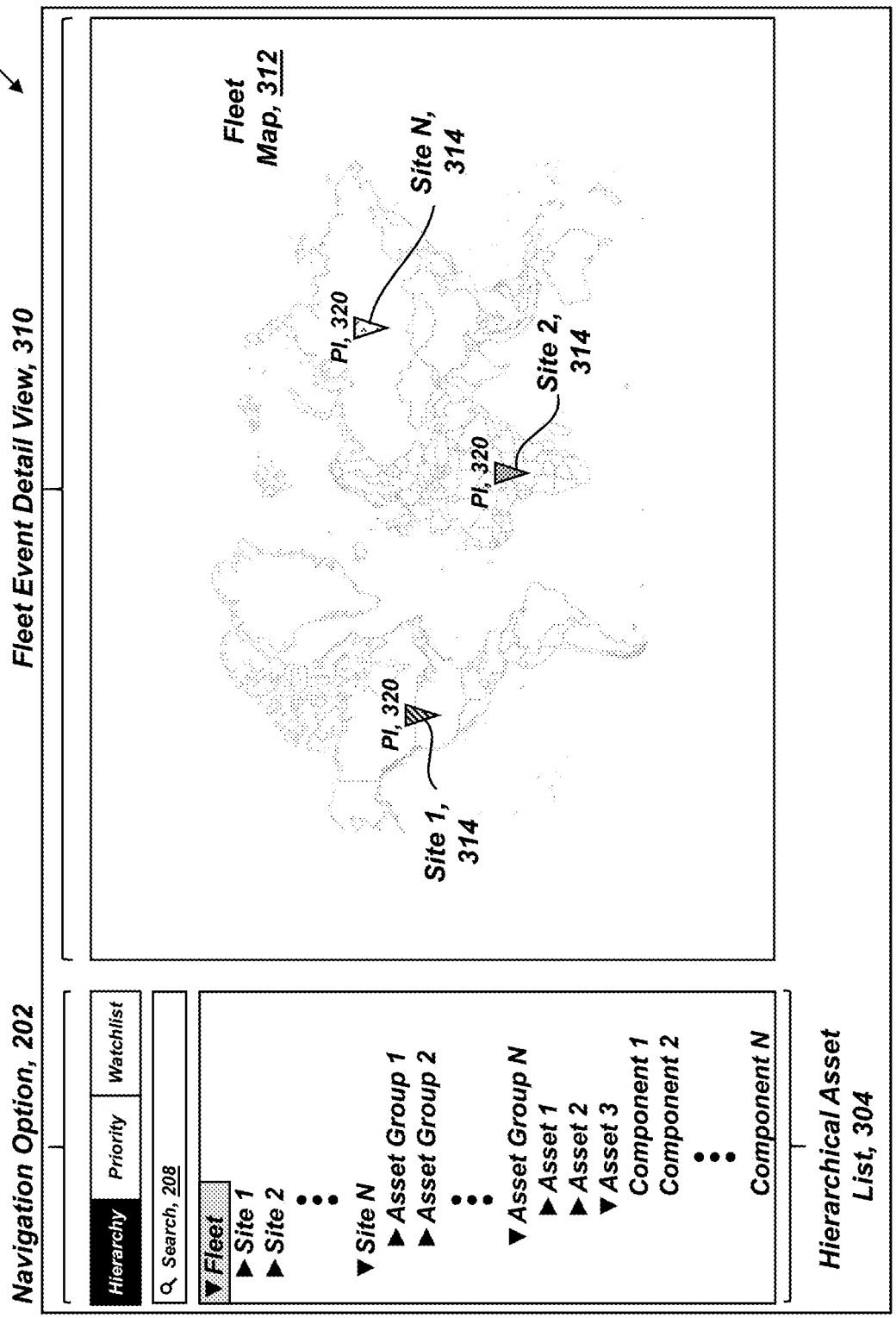
FIG. 3 is a schematic diagram illustrating the GUI of FIG. 2 after selection of a hierarchy navigation option from the navigation options, where a hierarchical list of assets of a fleet is presented in the first window and respective assets of the fleet and a fleet map representing sites of the fleet and corresponding event priority indices are presented in the second window.

FIG. 3 is a schematic diagram illustrating the GUI 126 in the form of GUI 300 after selection of hierarchy navigation from the navigation option 202. As shown, the asset list 204 is provided in the form of a hierarchical asset list 304. As shown, the hierarchical asset list 304 includes a plurality of levels, such as a fleet level, a site level, an asset group level, an asset level, and a component level.

The GUI 300 can be configured to receive a user selection (e.g., user selection 124) of an asset (e.g., a hierarchical level) from the hierarchical asset list 304. In response to receipt of this hierarchical level selection, the event analyzer 116 can determine the assets 106 and corresponding events associated with the selected hierarchical level.

As discussed above, the highest hierarchical level can be the fleet level. Thus, selection of the fleet level can include all assets 106 of the fleet (e.g., all assets within each site) and all events of the fleet.

The second highest hierarchical level can be the site level and it can include one or more sites (e.g., site 1, site 2, . . . site N). Selection of a site from the site level can include the assets 106 associated with the selected site (e.g., asset groups and other hierarchically lower levels, as discussed below) and information (e.g., at least a portion of events, analytics, strategies, etc.) corresponding to the assets of the selected site.

The third highest hierarchical level can be the asset group level (e.g., asset group 1, asset group 2, . . . asset group N). Thus, selection of an asset group from the asset group level can include the assets 106 associated with the selected asset group and information (e.g., at least a portion of events, analytics, strategies, etc.) corresponding to the assets 106 of the selected asset group.

The fourth highest hierarchical level can be the asset level (e.g., asset 1, asset 2, asset N). Thus, selection of an asset 106 of the asset level can include the selected asset 106 and information (e.g., at least a portion of events, analytics, strategies, etc.) corresponding to the selected asset 106. Optionally, when asset components are monitored, selection of an asset 106 of the asset level can further include the components associated with the selected asset 106 and information (e.g., at least a portion of events, analytics, strategies, etc.) corresponding to the selected asset 106.

The fifth highest hierarchical level can be the asset component level (e.g., component 1, component 2, component N), when present. Thus, selection of a component from the component level can include the selected component and information (e.g., at least a portion of events, analytics, strategies, etc.) corresponding to the selected component.

As further shown in FIG. 3, when the fleet level is selected, the event analyzer 116 can be configured to update the GUI to present the detail view 210 in the form of a fleet event detail view 310. In an embodiment, the fleet detail view 310 can include a graphical representation of the fleet, such as a fleet map 312 illustrating sites 314 of the fleet. Priority index PI values 320 corresponding to one or more of sites 314 can also be presented in the fleet map 312. In certain embodiments, the PI values 320 can be positioned within the site map 312 on or adjacent to the graphical representation of the corresponding site 314.

Figure 4:
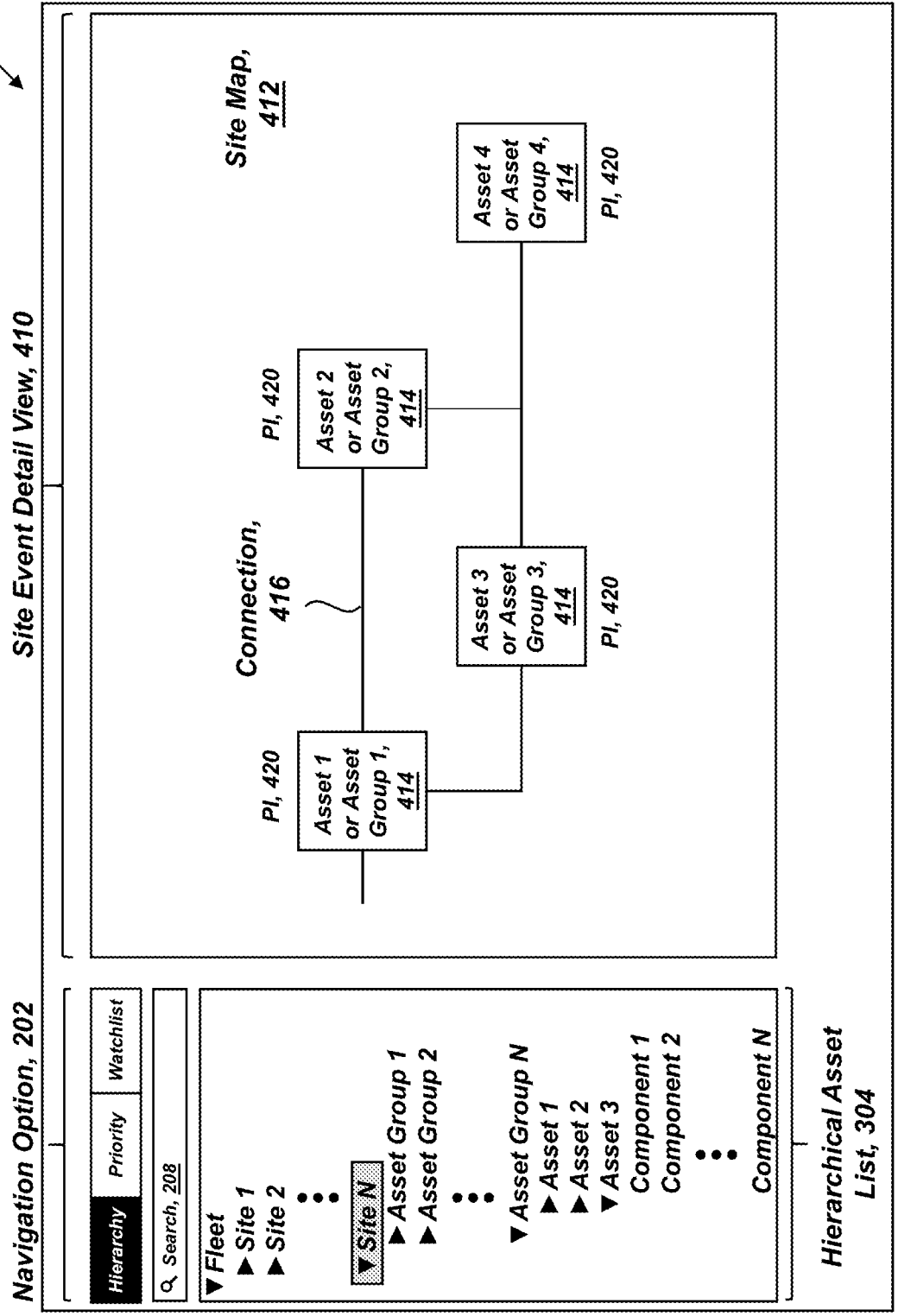
FIG. 4 is a schematic diagram illustrating the GUI of FIG. 2 after selection of the hierarchy navigation option from the navigation options and selection of a site in the first window, where respective assets of the selected site and corresponding event priority indices are presented in the second window.

FIG. 4 illustrates the GUI 126 in the form of GUI 400 that is generated by the event analyzer 116 when a site (e.g., site N) is selected from the hierarchical asset list 304. As shown, the detail view 210 is in the form of a site event detail view 410. The site event detail view 410 can include a graphical representation of the site, such as a site map 412 illustrating assets 106 or asset groups 414 within the site. Connections 416 between respective assets 106 or asset groups 416 can also be shown. The connections 416 can be physical and/or logical connections. Priority index PI values 420 corresponding to one or more of the assets 106 or asset groups 414 can also be presented in the site event detail view 410. In certain embodiments, the priority index PI values 420 can be positioned within the site map 412 on or adjacent to the graphical representation of the corresponding asset 106 or asset group 414.

Figure 5:
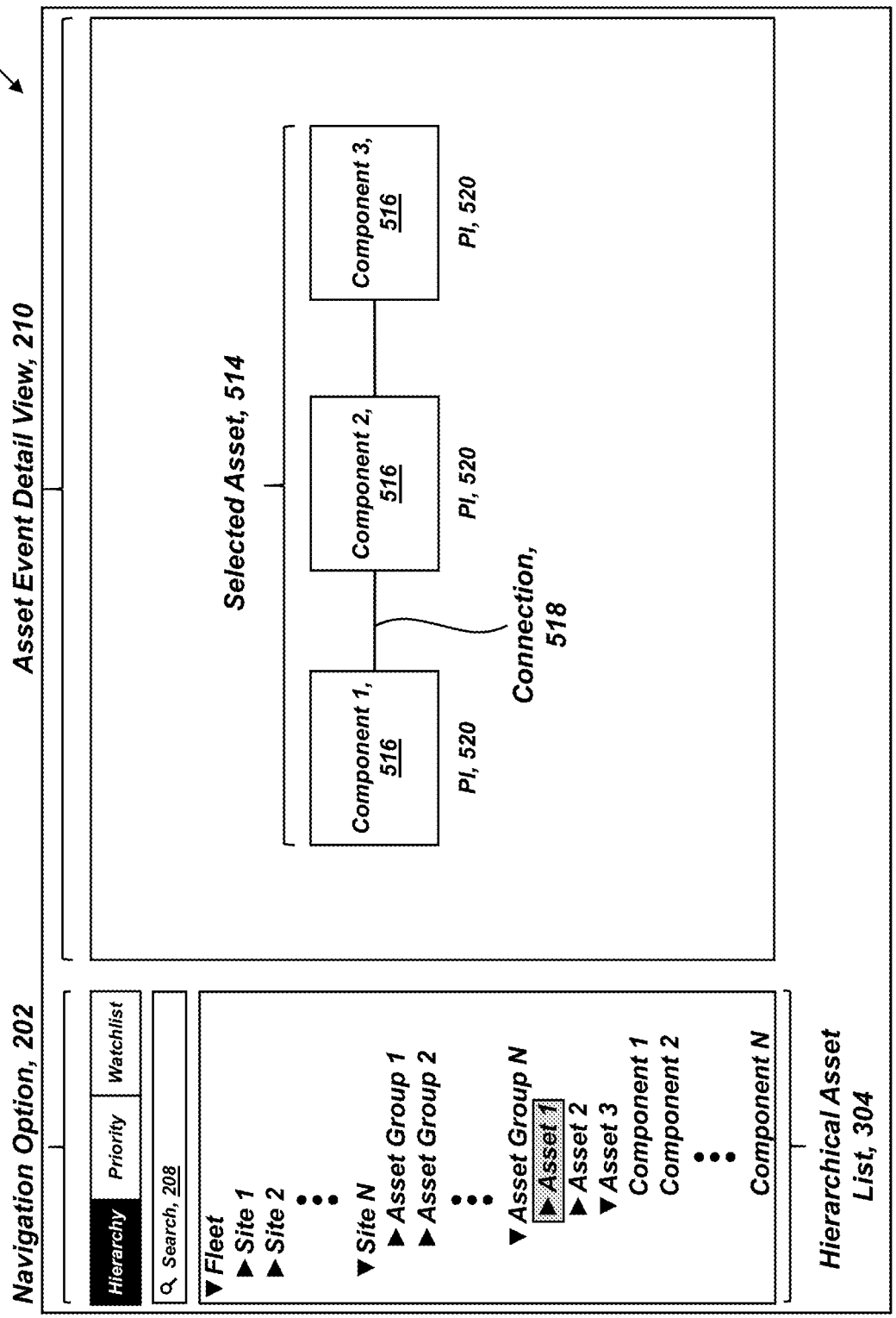
FIG. 5 is a schematic diagram illustrating the GUI of FIG. 2 after selection of the hierarchy navigation option from the navigation options and selection of an asset from the hierarchical list of assets in the first window, where respective components of the selected asset and corresponding event priority indices are presented in the second window.

FIG. 5 illustrates the GUI 126 in the form of GUI 500 that is generated by the event analyzer 116 when an asset (e.g., asset 1) is selected from the hierarchical asset list 304. As shown, the detail view 210 is an asset event detail view 510. The asset event detail view 510 can include a graphical representation of the selected asset 514, alone or in combination with components 516 of the asset. When components 516 are illustrated, connections 518 between respective components 516 can also be shown. The connections 518 can be physical and/or logical connections. Priority index PI values 520 corresponding to the selected asset 514 and/or one or more components 516 can also be presented in the asset detail view 510. In certain embodiments, the PI values 520 can be positioned on or adjacent to the graphical representation of the selected asset 514 or component 518.

Figure 6:
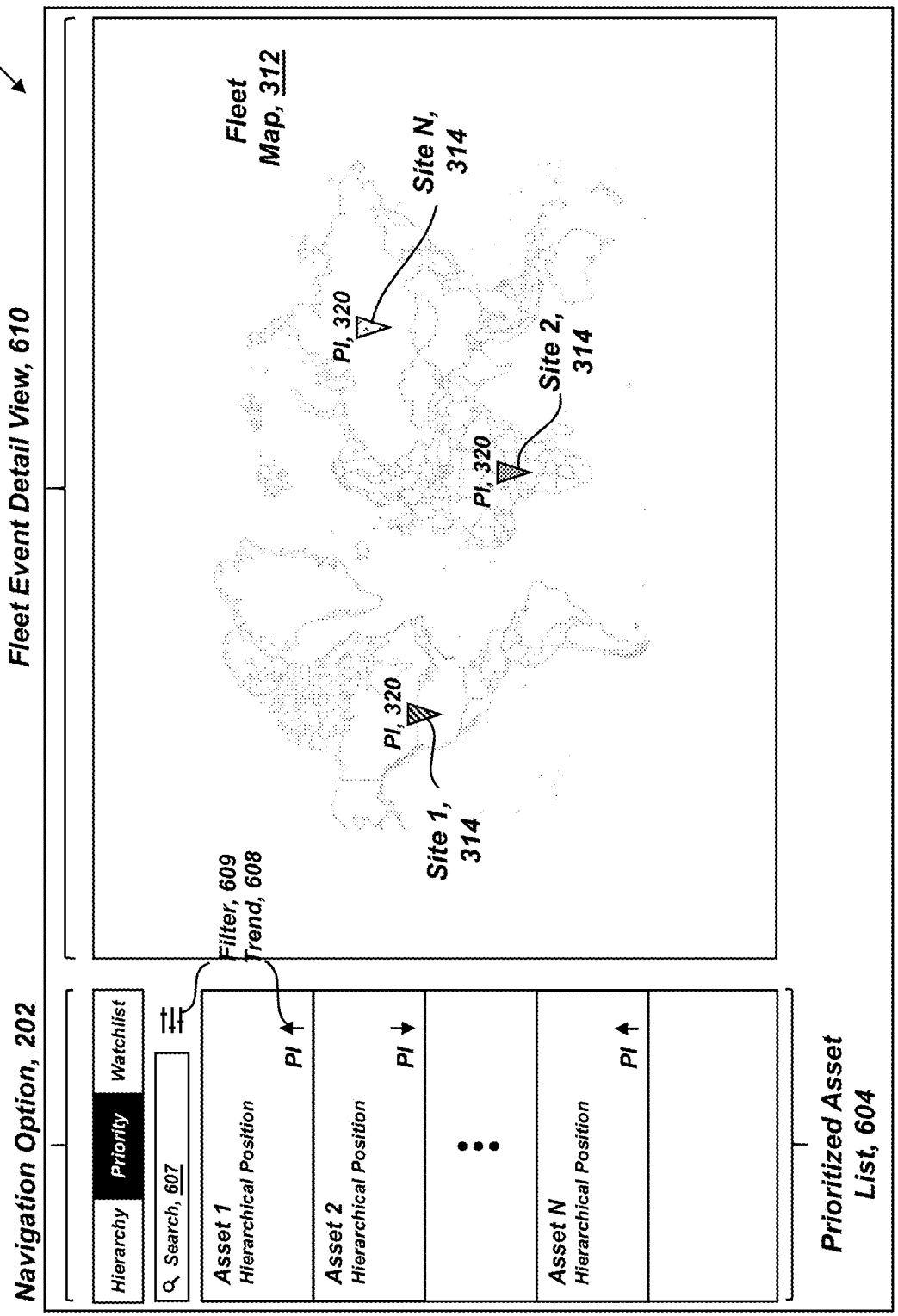
FIG. 6 is a schematic diagram illustrating the GUI of FIG. 2 after selection of a priority navigation option from the navigation options, where the GUI is updated to present a prioritized asset list in the first window including a plurality of assets of the fleet organized by corresponding priority event indices and to present respective sites of the fleet and corresponding event priority indices in the second window.

FIG. 6 is a schematic diagram illustrating the GUI 126 in the form of GUI 600 after selection of priority navigation from the navigation options. The asset view list 204 is updated to include a prioritized asset list 604. As shown, the prioritized asset list 604 includes a plurality of assets listed in order of priority (e.g., priority descending moving down the list). A trend 608 in the priority index PI (e.g., absolute difference, percentage difference, up/down) between a current time and a prior time can also be illustrated. A search window 607 can be provided for entering search terms to search the prioritized asset list 604. Options for filtering the prioritized asset list 604 can be accessed by selection of a user interface object (e.g., filter 609), discussed in greater detail below with respect to FIG. 8.

The GUI 600 can be configured to receive a user selection (e.g., user selection 124) of an asset from the prioritized asset list 604. In one aspect, as shown in FIG. 6, when no asset is selected in the prioritized asset list 604, the fleet (e.g., all assets) is considered to be the selected asset. Thus, the detail view 210 is a fleet event view 610. The fleet event detail view 610 can be the same as the fleet event detail view 310 discussed above with regards to FIG. 3.

Figure 7:
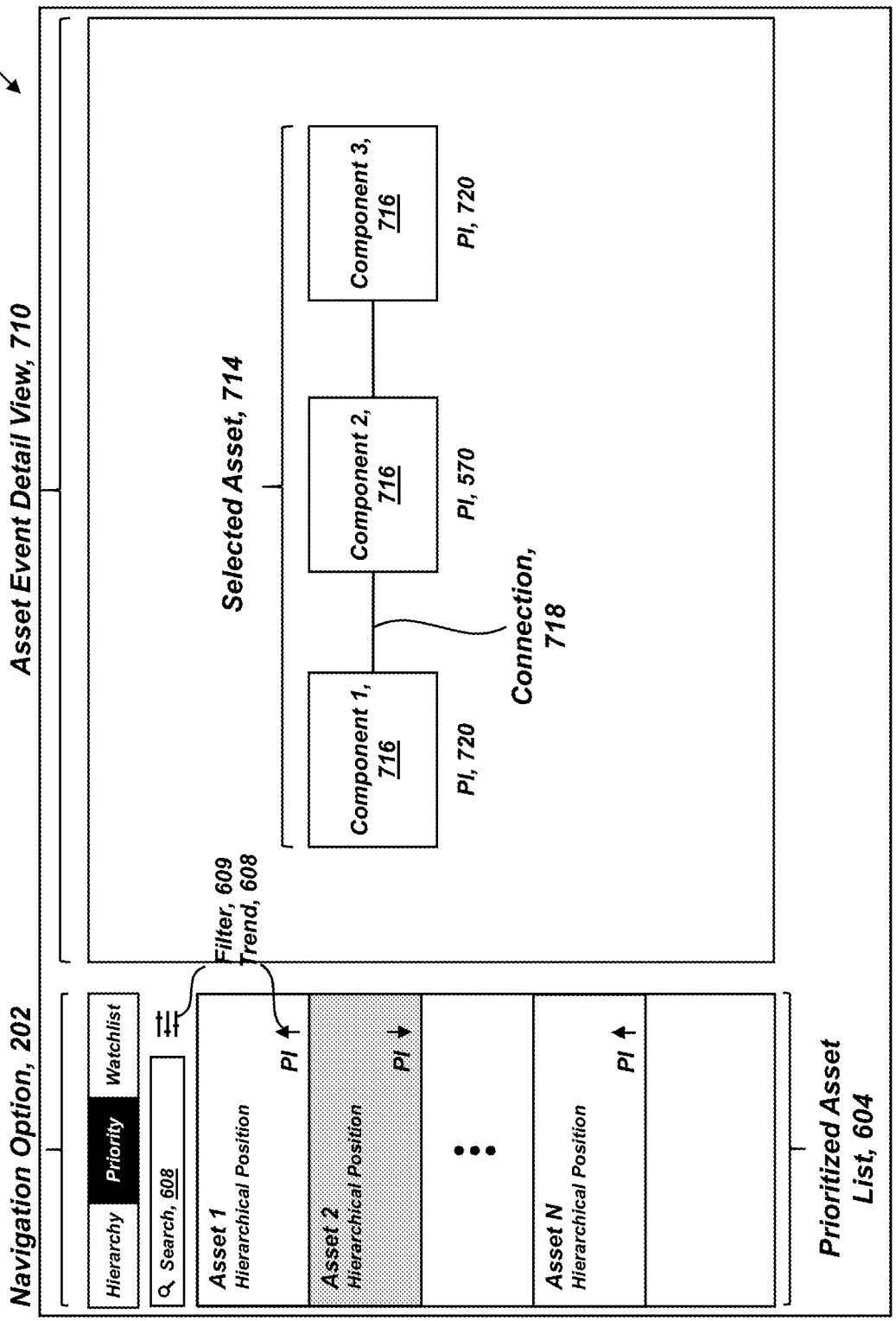
FIG. 7 is a schematic diagram illustrating the GUI of FIG. 2 after selection of the priority navigation option and selection of an asset from the plurality of assets in the first window, where respective components of the selected asset and corresponding event priority indices are presented in the second window.

In another aspect, FIG. 7 illustrates the GUI 126 in the form of GUI 700 that is generated when an asset 714 is selected from the prioritized asset list 304. As shown, the detail view 210 is an asset event detail view 710. The asset event detail view 710 can include a graphical representation of the selected asset 714, alone or in combination with components 716 of the asset. When components 716 are illustrated, connections 718 between respective components 716 can also be shown. The connections 718 can be physical and/or logical connections. Priority index PI values 720 corresponding to the selected asset 714 and/or one or more components 716 can also be presented in the asset detail view 710. In certain embodiments, the PI values 720 can be positioned on or adjacent to the graphical representation of the selected asset 714 or component 718.

FIG. 8 illustrates the GUI 126 in the form of GUI 800 that is generated when the filter option 609 is selected in the GUI 600. As shown, a plurality of filter and sort options 804 are displayed. A sort window 805 allows input of options for sorting the prioritized asset list 604 (e.g., ascending priority order, descending priority order, ascending alphabetical order, descending alphabetical order, etc.) As a result, assets will be displayed within the prioritized asset view 604 in an order determined by the input sorting option. A location window 806 allows input of a location (site) for filtering the prioritized asset list 604. As a result, only events assets 106 associated with the input site will be displayed in the prioritized asset view 604.

In certain embodiments, logged events (e.g., alarms) can be associated with a source. Examples of event sources can include, but are not limited to, an asset 106 (e.g., based upon measurements of operational parameters of the asset 106) and instrumentation (e.g., sensors that measure the operational parameters). In either case, such events can be assigned a level representing their relative severity. Identifying events by their source can be beneficial, as events logged based upon measurements of operational parameters are only reliable when the instrumentation measuring the operational parameters are functioning correctly. The ability to examine events by both asset and instrumentation source can allow a user can identify asset events arising from instrumentation errors, rather than true events experienced by the asset 106. Accordingly, in further embodiments, the filter and sort options 804 can include options for filtering based upon a level of asset event severity 810*a* and/or a level of instrumentation event severity 810*b*.

Further filter and sort options 804 can be provided to facilitate collaboration amongst multiple users. In one aspect, because the event analyzer 116 logs events automatically, it cannot be assumed that any user has viewed any given event without confirmation. Thus, events can be designated with a status of unacknowledged prior to viewing by a user and a status of acknowledged after viewing by a user to provide this confirmation. The filter and sort options 804 can include an event status filter 812 to allow users to quickly view assets having acknowledged or unacknowledged events.

In another aspect, cases can be assigned to respective assets. In general, a case can provide a record of actions taken regarding the asset, such as actions taken regarding respective events. Cases can also be designated with a case priority (e.g., high, medium, low) and a case status (e.g., open, review, close). Open can refer to a case that is pending review. Review can refer to a case in which a review has been started but not completed. Closed can refer to a case after review that is no longer active. The filter and sort options 804 can include a case priority filter 814 and a case status filter 816 to allow users to quickly view assets based upon their case priority and/or case status. It can be appreciated that the above-discussed sort and filter options 804 are provided for the purpose of illustration and other sort and filter criteria can be employed without limit.

Figure 9:
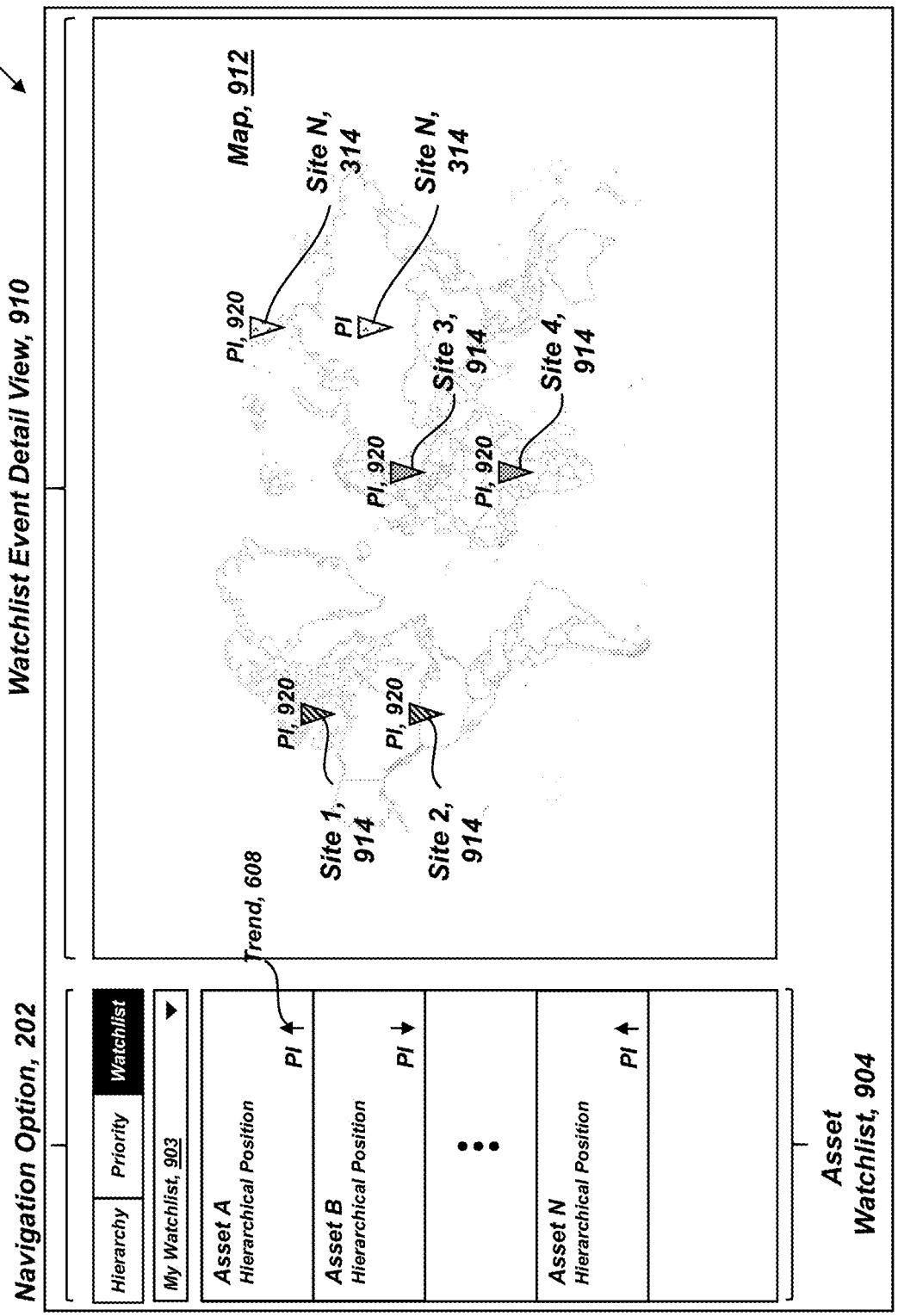
FIG. 9 is a schematic diagram illustrating the GUI of FIG. 2 after selection of a watchlist navigation option from the navigation options, where the GUI is updated to present a selected watchlist in the first window including a plurality of assets of the fleet organized by corresponding priority event indices and to present respective sites of the fleet and corresponding event priority indices in the second window.

FIG. 9 is a schematic diagram illustrating the GUI 126 in the form of GUI 900 after selection of watchlist from the navigation options. In general, a watchlist can be one or more assets that have been selected from the plurality of assets 106. The assets 106 can be assigned to a respective watchlist by selection of a user interface object (not shown) within the asset watchlist 904 or other selection mechanism (e.g., from a menu accessed via a right mouse click when an asset is selected). The assets included in a watchlist can be selected by a user for their own use (e.g., a personal watchlist) and/or for sharing with other users (e.g., a group watchlist).

The GUI 900 can be configured to receive a user selection (e.g., user selection 124) of an asset from the asset watchlist 904. In one aspect, shown in FIG. 9, if no asset is selected in the asset watchlist 904, all assets of the selected watchlist are considered to be the selected asset. Accordingly, the detail view 210 is in the form of a watchlist event detail view 910. The watchlist event detail view 910 can include a graphical representation, such as a map 912 illustrating sites 914 of the assets of the selected watchlist. Priority index PI values 920 corresponding to one or more of sites 914 can also be presented in the map 912. In certain embodiments, the PI values 920 can be positioned within the map 912 on or adjacent to the graphical representation of the corresponding site 914.

Figure 10:
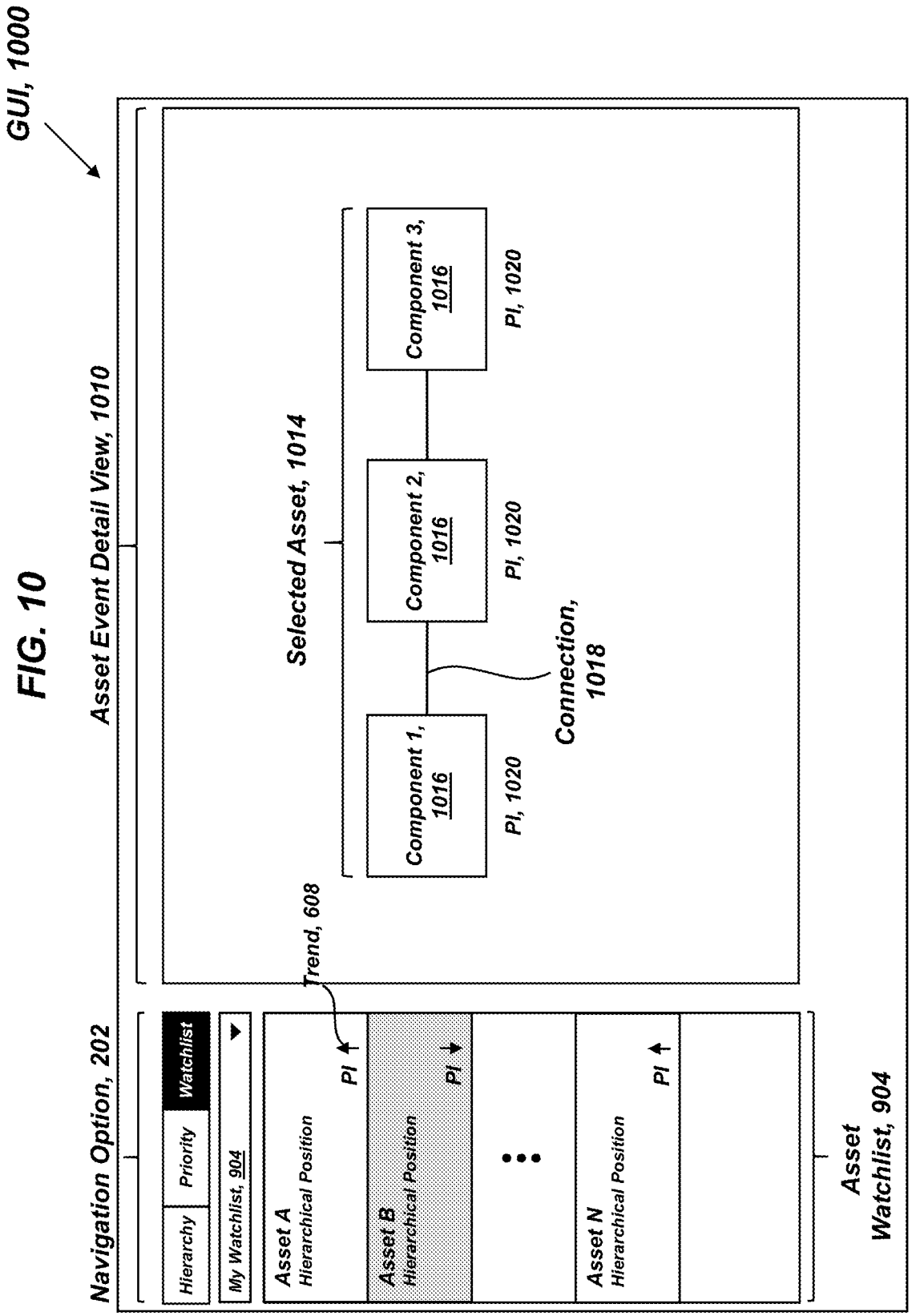
FIG. 10 is a schematic diagram illustrating the GUI of FIG. 2 after selection of the watchlist navigation option and selection of an asset from the plurality of assets in the first window, where respective components of the selected asset and corresponding event priority indices are presented in the second window.

In another aspect, FIG. 10 illustrates the GUI 126 in the form of GUI 1000 that is generated when an asset 1014 is selected from the asset watchlist 904. As shown, the detail view 210 is an asset event detail view 1010. The asset event detail view 1010 can include a graphical representation of the selected asset 1014, alone or in combination with components 1016 of the asset. When components 1016 are illustrated, connections 1018 between respective components 1016 can also be shown. The connections 1018 can be physical and/or logical connections. Priority index PI values 1020 corresponding to the selected asset 1014 and/or one or more components 1016 can also be presented in the asset detail view 1010. In certain embodiments, the PI values 1020 can be positioned on or adjacent to the graphical representation of the selected asset 1014 or component 1018.

In further embodiments, the event detail view 210 displayed in the GUI 126 (e.g., GUIs, 400, 500, 700, 1000) can adopt a variety of different forms. These forms can be selected by a user using one or more user interface objects (not shown) of the GUI 126.

Figure 11A:
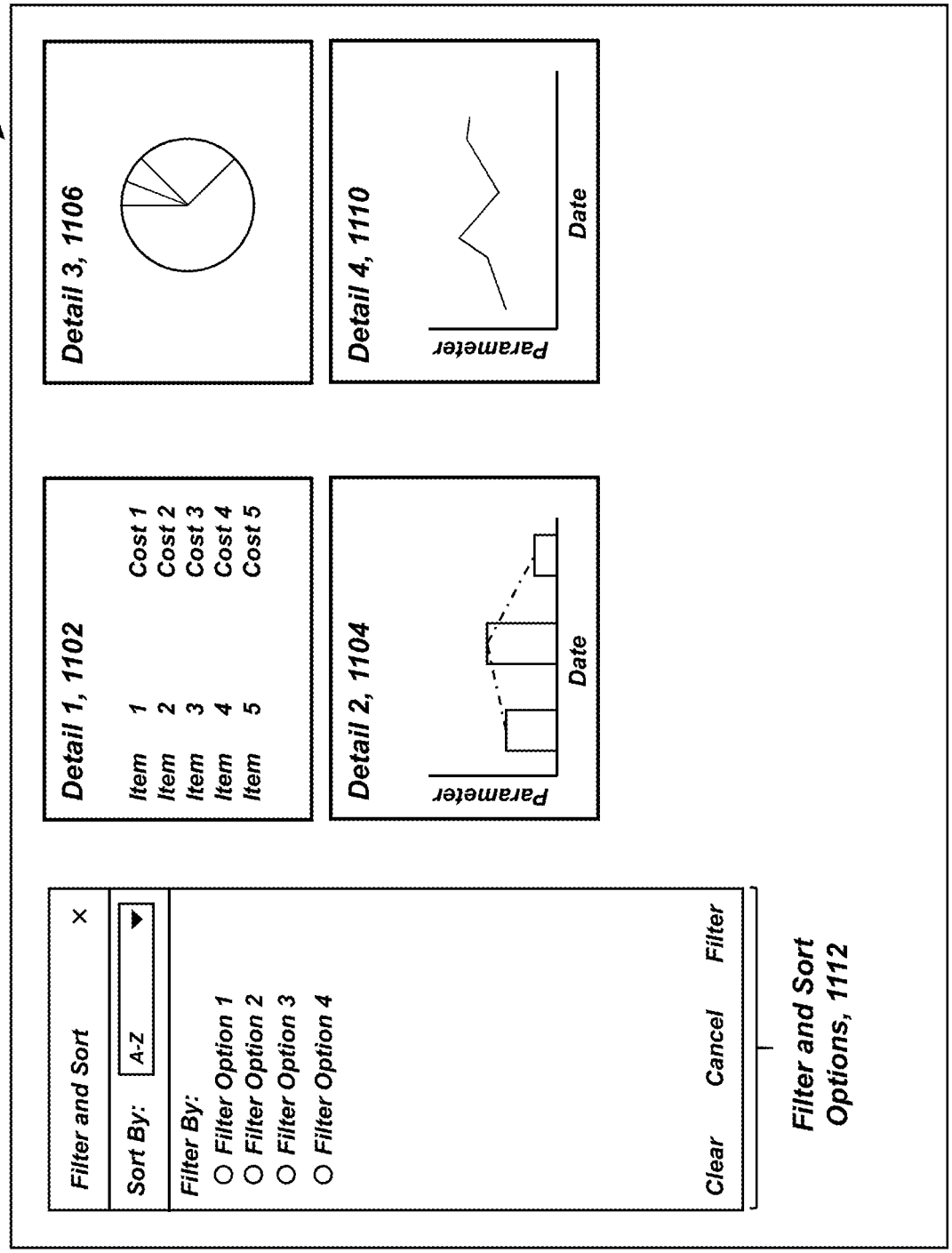

In one example, illustrated in FIG. 11A, the event detail view 210 can adopt the form of asset event detail view 1100. As shown, the asset event detail view 1100 can include one or more windows (e.g., windows 1102, 1104, 1006, 1110) including information for events corresponding to the selected asset (or all assets by default if no asset is selected in the asset hierarchy list 304, the prioritized asset list 604, or the asset watchlist 904). Examples of event information can include, but is not limited to risk, risk summaries, actions, maintenance plans, maintenance costs, compliance, asset status, alarm status, alarm trends, and the like. The event information can be provided in any form, including but not limited to lists and/or plots (e.g., bar charts, pie charts, scatter plots, etc.) Examples of event information can include, but is not limited to risk, risk summaries, actions, maintenance plans, maintenance costs, compliance, asset status, alarm status, alarm trends, and the like. The event information can be provided in any form, including but not limited to lists and/or plots (e.g., bar charts, pie charts, scatter plots, etc.)

Figure 11B:
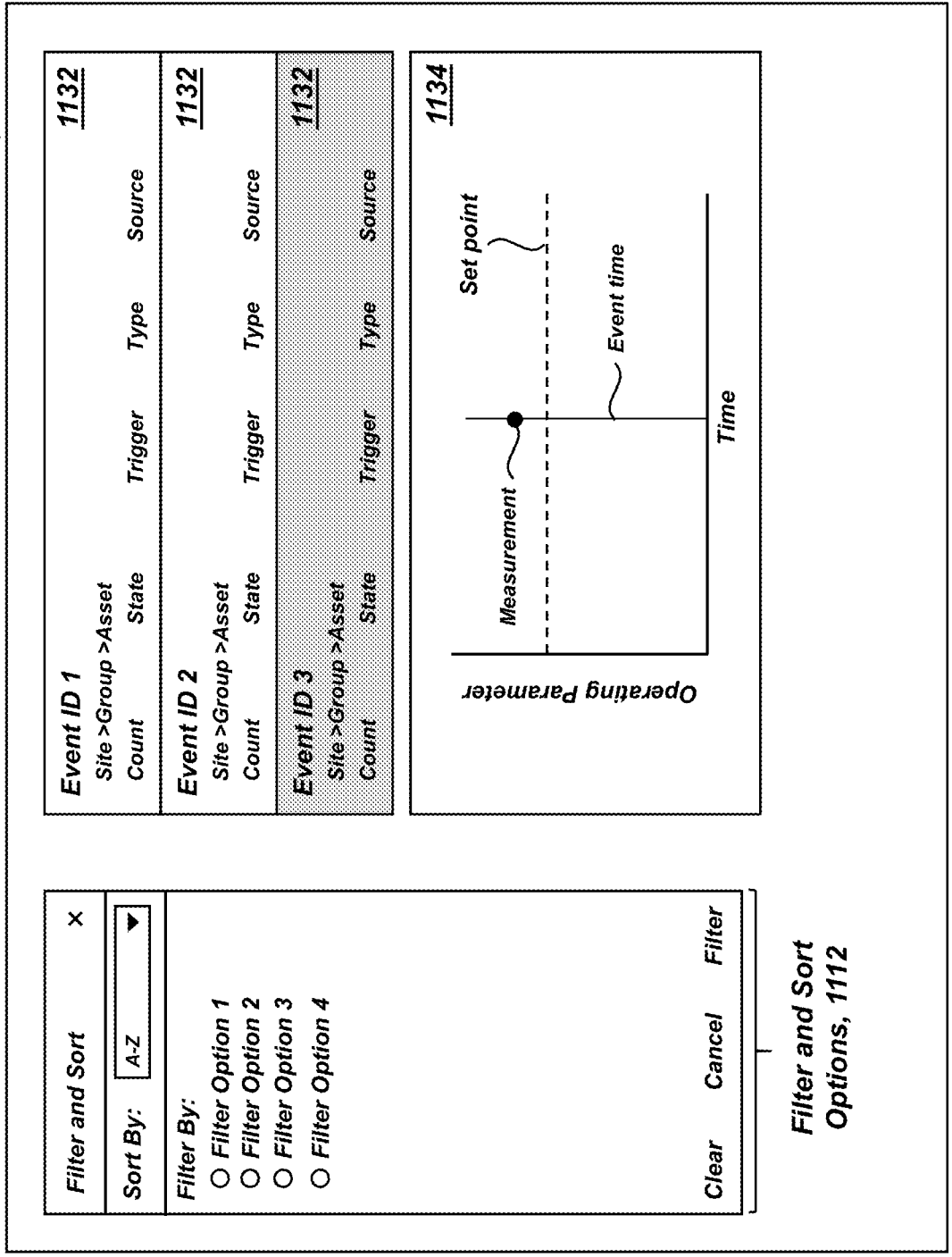

In another example, illustrated in FIG. 11B, the detail view 210 can adopt the form of asset event detail view 1130. As shown, the asset event detail view 1130 can include a one or more windows (e.g., windows 1132, 1134) including information for events corresponding to the selected asset (or all assets by default if no asset is selected in the asset hierarchy list 304, the prioritized asset list 604, or the asset watchlist 904). As shown, the windows 1132 can include a list of respective events and one or more event detail summaries. Non-limiting examples of summarized event data can include, but is not limited to, an event occurrence count, the asset state (startup, running (normal operation), shutdown, etc.), the event trigger value (alone or in combination with a measured operating parameter value causing the event to be triggered), the event type (e.g., alarm, system health, instrument health, or analytical health), and the event source.

In further embodiments, an event listed in one of the windows 1132 can be selected to obtain further event detail information. As shown in window 1134, the event detail information can include a plot of one or more measured operating parameters acquired before, during, and/or after the event from window 1134. Optionally, one or more set points can be overlaid on the plot. It can be appreciated that the plot can display other data in any format as necessary.

In another example, illustrated in FIG. 11C, the detail view 210 can adopt the form of asset event detail view 1150. As shown, the asset event detail view 1150 can include a one or more windows (e.g., windows 1152, 1154) including information regarding cases assigned to respective events. In general, cases represent a record of investigation and/or maintenance regarding the corresponding event. As an example, respective case summaries can be displayed in windows 1152. The case summaries can include information such as a case identification (case ID), the corresponding asset, and assigned user. Selection of a case summary from the windows 1152 can cause more detailed case information to be displayed regarding the selected summary in window 1154. As an example, the detailed case information can include, but is not limited to, actions taken, respective dates of action, and authorization for the action taken. Such information can be beneficial for audit tracking and quality assurance.

Embodiments of the event information displayed in any of FIGS. 11A-11C can be subject to filtering and/or sorting using filter and sort options 1112. The filter and sort options 112 can be accessed from the filter 609 object or other user interface objects (not shown), as necessary.

Figure 12:
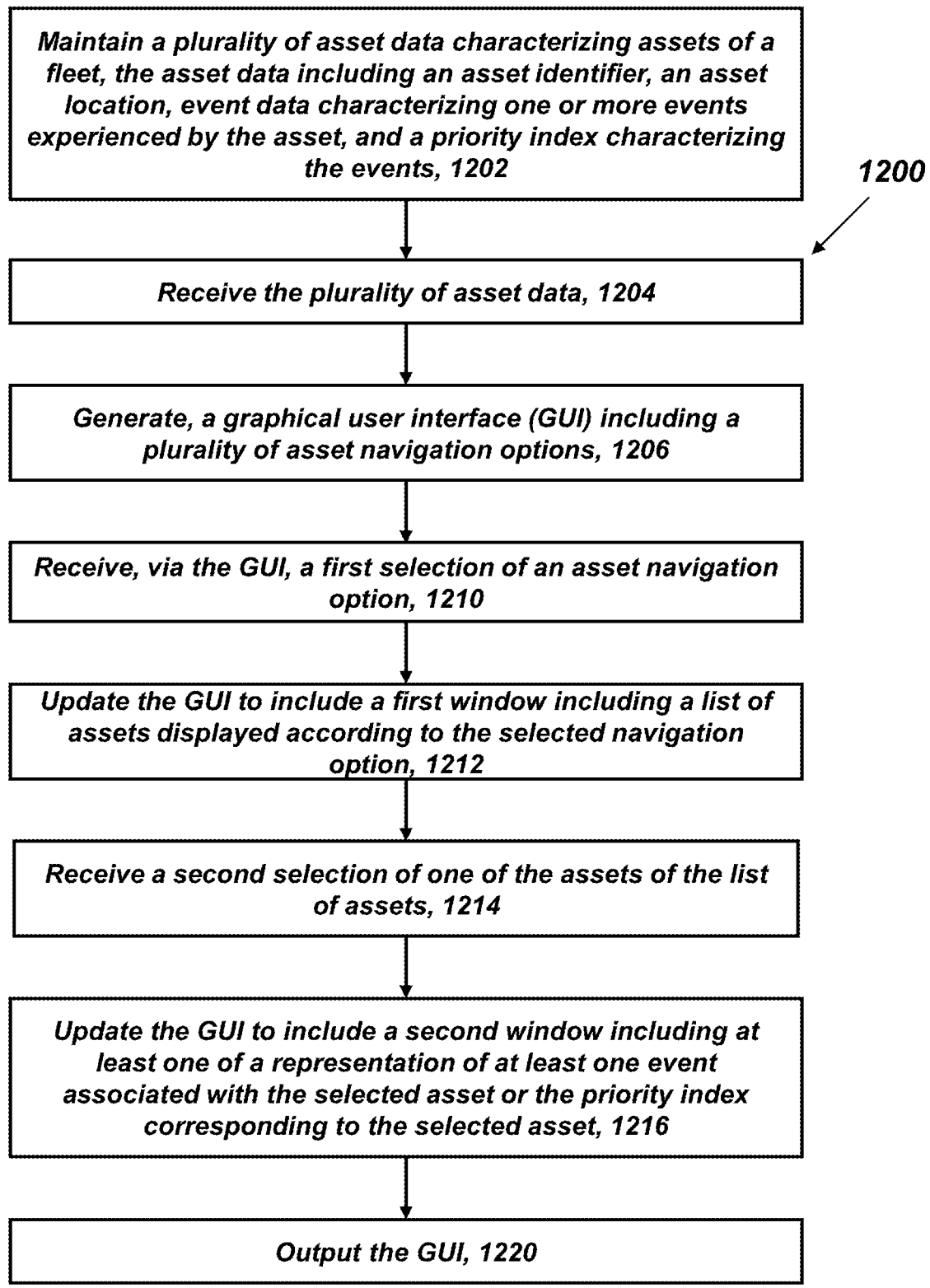
FIG. 12 is a flow diagram illustrating one exemplary embodiment of a method for visualizing events including event priority indices.

FIG. 12 is a flow diagram illustrating one exemplary embodiment of a method 1200 for asset management employing embodiments of the systems discussed herein. As shown, the method 1200 includes operations 1202-1220.

However, in alternative embodiments, the method can include greater or fewer operations and the operations can be performed in a different order than illustrated in FIG. 12.

In operation 1202, a plurality of asset data can be maintained. The asset data can include data that characterizes respective assets of a plurality of assets distributed among different sites of a fleet. The asset data for an asset can include one or more of an asset identifier, a location of the asset within an asset hierarchy of the fleet, event data characterizing one or more events experienced by the asset, or a priority index that characterizes the one or more events. As an example, the plurality of asset data can be maintained by the historian 120, alone or in combination with other electronic storage devices.

In operation 1204, the event analyzer 116 can receive at least a portion of the plurality of asset data.

In operation 1206, the event analyzer can further generate the GUI 126 including a plurality of asset navigation options. Examples of the asset navigation options can include, but are not limited to, the hierarchy option, the priority option, and the watchlist option, as discussed above.

In operation 1210, the event analyzer 116 can receive, via the GUI 126, a first selection of an asset navigation option from the plurality of asset navigation options.

In operation 1212, the event analyzer 116 can update the GUI 126 in response to receipt of the first selection. The updated GUI can include a first window listing a plurality of assets displayed according to the selected navigation option. In the context of the hierarchy option, the listed plurality of assets can be the hierarchical asset list 304. In the context of the priority option, the listed plurality of assets can be the prioritized asset list 604. In the context of the watchlist option, the listed plurality of assets can be the asset watchlist 904.

In operation 1214, the event analyzer 116 can receive a second selection of at least one asset from the plurality of assets via the GUI 126. In the context of the hierarchy option, the second selection can be a hierarchical level or specific asset of the hierarchical asset list 304. In the context of the priority option, the second selection can be an asset selected from the prioritized asset list 604. In the context of the watchlist option, the second selection can be an asset selected from the asset watchlist 904.

In operation 1216, the event analyzer 116 can be configured to update the GUI 126 to include a second window including at least one of a representation of at least one event associated with the at least one asset. The second window can further include the priority index corresponding to the at least one asset.

In operation 1220, the event analyzer 116 can output the GUI 126. For example, the GUI 126 can be output to the user computing device 122 for display of the GUI 126.

Exemplary technical effects of the methods, systems, and devices described herein include, by way of non-limiting example improved visualization of events for condition monitoring. In one aspect, a variety of options are provided for presenting a list of assets for navigation. The options can include hierarchical and prioritized navigation options. These options provide a user with flexibility to select a navigation option that is suitable for their workflow and current task needs. In further embodiments, a priority index can generated that characterizes events experienced by respective assets. The priority index can be used to organize the list of assets displayed and/or can be displayed in summaries and/or detailed information regarding assets selected from the list of assets. In this manner, users can quickly identify assets in need of further examination and deployment of resources for such examination.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data.

Generally, a computer will also include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magnetooptical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An asset management system comprising:
a historian comprising one or more computing devices and configured to maintain a plurality of asset data characterizing respective assets of a plurality of assets distributed among different sites of a fleet, wherein the asset data for an asset includes an asset identifier, a location of the asset within an asset hierarchy of the fleet, event data characterizing one or more events experienced by the asset, and case data characterizing a record of actions taken regarding the one or more events experienced by the asset; and
an analyzer including one or more processors configured to receive the plurality of asset data and configured to:
generate, for each asset of the plurality of assets, a case status based on the record of actions taken regarding the one or more events experienced, wherein the case status is chosen from a plurality of case statuses including an open status, an under review status and a closed status;
generate, for each asset of the plurality of assets, an event status based on the one or more events experienced by the asset, wherein the event status is chosen from a plurality of event statuses including an acknowledged status indicating that the event has been viewed by a user and an unacknowledged status indicating that the event has not been viewed by a user;
generate, for each asset of the plurality of assets, a relative priority ranking based on the one or more events experienced by the asset relative to the one or more events experienced by the plurality of assets;
generate a graphical user interface (GUI) including a plurality of asset navigation buttons comprising at least a hierarchy view button configured to organize the plurality of assets according to the asset hierarchy of the fleet, a priority view button configured to organize the plurality of assets according to the plurality of relative priority rankings and a filtering view button configured to allow a user to filter or sort the plurality of assets within the priority view based on at least case status, event status and relative priority ranking;
receive, via the GUI, a first selection of an asset navigation button from the plurality of asset navigation buttons;
update the GUI in response to receipt of the first selection to include a first window listing a plurality of assets organized according to the selected navigation button, wherein, responsive to selection of the hierarchy view button, the first window includes a hierarchical asset list including a plurality of sites with respective assets of the plurality of assets organized under respective sites according to their position within the asset hierarchy of the fleet and the analyzer is further configured to update the GUI to include a second window including a visual representation of the plurality of sites including a plurality of site priority rankings determined based on the plurality of relative priority rankings;

receive a second selection an asset from the plurality of assets within the first window; and update the GUI to include a third window including a representation of the selected asset.

2. The system of claim 1 wherein, responsive to selection of the priority view button within the first window, the analyzer is further configured to:

update the GUI to include a fourth window including a visual representation of the plurality of assets including the plurality of relative priority rankings.

3. The system of claim 1, wherein, when the selected navigation button is the priority view button, the analyzer is further configured to:

store the selected asset in a watchlist of one or more user-defined watchlists.

4. The system of claim 3, wherein the plurality of asset navigation buttons further comprise a watchlist view button configured to organize the plurality of assets according to one or more user-defined watchlists, and wherein, responsive to selection of the watchlist view button, the analyzer is further configured to:

update the GUI to include a fourth window including a visual representation of one or more user-defined watchlists including a plurality of sites with respective assets of the plurality of assets organized under respective sites according to their position within the asset hierarchy of the fleet and a plurality of site priority rankings determined based on the plurality of relative priority rankings.

5. The system of claim 1, wherein the event data includes data characterizing at least one of an alarm, a condition monitoring system health event, an instrument health event, and an analytical health event.

6. A method of asset management, comprising:

maintaining, by a memory device, a plurality of asset data characterizing respective assets of a plurality of assets distributed among different sites of a fleet, wherein the asset data for an asset includes an asset identifier, a location of the asset within an asset hierarchy of the fleet, event data characterizing one or more events experienced by the asset, and case data characterizing a record of actions taken regarding the one or more events experienced by the asset;

receiving, by one or more processors, the plurality of asset data;

generating, for each asset of the plurality of assets, a case status based on the record of actions taken regarding the one or more events experienced, wherein the case status is chosen from a plurality of case statuses including an open status, an under review status and a closed status;

generating, for each asset of the plurality of assets, an event status based on the one or more events experienced by the asset, wherein the at least one event status is chosen from a plurality of event statuses including an acknowledged status indicating that the event has been viewed by a user and an unacknowledged status indicating that the event has not been viewed by a user;

generating, for each asset of the plurality of assets, a relative priority ranking based on the one or more events experienced by the asset relative to the one or more events experienced by the plurality of assets;

generating, by the one or more processors, a graphical user interface (GUI) including a plurality of asset navigation buttons comprising at least a hierarchy view button configured to organize the plurality of assets according to the asset hierarchy of the fleet, a priority view button configured to organize the plurality of assets according to the plurality of relative priority rankings and a filtering view button configured to allow a user to filter or sort the plurality of assets within the priority view based on at least case status, event status and relative priority ranking;

receiving, by the one or more processors via the GUI, a first selection of an asset navigation button from the plurality of asset navigation buttons;

updating, by the one or more processors, the GUI in response to receipt of the first selection to include a first window listing a plurality of assets organized according to the selected navigation button, wherein, responsive to selection of the hierarchy view button, the first window includes a hierarchical asset list including a plurality of sites with respective assets of the plurality of assets organized under respective sites according to their position within the asset hierarchy of the fleet and the one or more processors are further configured to update the GUI to include a second window including a visual representation of the plurality of sites including a plurality of site priority rankings determined based on the plurality of relative priority rankings;

receiving, by the one or more processors, a second selection of an asset from the plurality of assets within the first window; and updating, by the one or more processors, the GUI to include a third window including a representation of the selected asset.

7. The method of claim 6, wherein, responsive to selection of the priority view button within the first window, the method further comprises:

updating, by the one or more processors, the GUI to include a fourth window including a visual representation of the plurality of assets including the plurality of relative priority rankings.

8. The method of claim 6, further comprising:

storing, by one or more processors, the selected asset in a watchlist of one or more user-defined watchlists.

9. The method of claim 8, wherein the plurality of asset navigation buttons further comprise a watchlist view button configured to organize the plurality of assets according to one or more user-defined watchlists, and wherein, responsive to selection of the watchlist view button, the method further comprises:

updating, by the one or more processors, the GUI to include a fourth window including a visual representation of one or more user-defined watchlists including a plurality of sites with respective assets of the plurality of assets organized under respective sites according to their position within the asset hierarchy of the fleet and a plurality of site priority rankings determined based on the plurality of relative priority rankings.

10. The method of claim 6, wherein the event data includes data characterizing at least one of an alarm, a condition monitoring system health event, an instrument health event, and an analytical health event.

* * * * *